(12) United States Patent
Nakahara et al.

(10) Patent No.: US 9,797,336 B2
(45) Date of Patent: Oct. 24, 2017

(54) INTAKE DEVICE OF ENGINE

(71) Applicant: Mazda Motor Corporation, Aki-gun, Hiroshima (JP)

(72) Inventors: Yasushi Nakahara, Higashihiroshima (JP); Yoshitaka Wada, Hiroshima (JP); Yohei Suzuki, Hiroshima (JP); Yuki Nabetani, Hatsukaichi (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 46 days.

(21) Appl. No.: 15/074,034

(22) Filed: Mar. 18, 2016

(65) Prior Publication Data

US 2016/0281633 A1    Sep. 29, 2016

(30) Foreign Application Priority Data

Mar. 24, 2015  (JP) ................................. 2015-061005

(51) Int. Cl.
*F02F 1/42* (2006.01)
*F02B 23/10* (2006.01)
(Continued)

(52) U.S. Cl.
CPC .......... *F02F 1/4235* (2013.01); *F02B 23/105* (2013.01); *F02B 31/085* (2013.01);
(Continued)

(58) Field of Classification Search
CPC ........ F02F 1/4235; F02F 1/242; F02F 1/4214; F02F 1/425; F02F 1/4257; F02B 2275/48;
(Continued)

(56) References Cited

U.S. PATENT DOCUMENTS 5,836,284 A * 11/1998 Oda ..................... F02B 17/005
                                                  123/188.14
2004/0226536 A1* 11/2004 Sakai ..................... F02B 23/08
                                                  123/308

(Continued)

FOREIGN PATENT DOCUMENTS

JP       H02204624 A       8/1990
JP       2003106180 A      4/2003
(Continued)

*Primary Examiner* — Lindsay Low
*Assistant Examiner* — George Jin
(74) *Attorney, Agent, or Firm* — Alleman Hall Creasman & Tuttle LLP

(57) ABSTRACT

An intake device of an engine having cylinders is provided. The intake device includes a cylinder head formed with two intake ports per cylinder, and a forced induction system. One of the two intake ports is designed to have a smaller passage cross-sectional area at a throat portion thereof than that of the other intake port, and to cause a strength of a tumble flow strength of intake air formed within a combustion chamber to be stronger when a flow of the intake air into the combustion chamber is assumed to be caused only from the one of the two intake ports, than only from the other intake port. A tumble ratio of the intake air flow within the combustion chamber is a predetermined value or greater when the intake air is forcibly induced and flows into the combustion chamber from the two intake ports.

8 Claims, 13 Drawing Sheets

(51) Int. Cl.
*F02B 31/08* (2006.01)
*F02B 37/00* (2006.01)
*F02B 75/12* (2006.01)

(52) U.S. Cl.
CPC ........ *F02B 37/00* (2013.01); *F02B 2023/106* (2013.01); *F02B 2075/125* (2013.01); *F02B 2275/48* (2013.01); *Y02T 10/146* (2013.01)

(58) Field of Classification Search
CPC ........ F02B 2023/106; F02B 2023/0615; F02B 23/105; F02B 31/085; F02B 31/04; F02B 31/082; F02B 37/00; F02M 35/10157; F02M 35/10163
See application file for complete search history.

(56) References Cited

U.S. PATENT DOCUMENTS

2006/0048738 A1* 3/2006 Isaji .................. F02B 31/06
 123/184.56
2017/0067390 A1* 3/2017 Yamamoto ............. F02B 23/00

FOREIGN PATENT DOCUMENTS

JP 2007046457 A * 2/2007 ............... F01L 3/06
JP 2010174702 A 8/2010

* cited by examiner

INTAKE DEVICE OF ENGINE

BACKGROUND

The present invention relates to a technical field of an intake device of an engine.

Conventionally, in order to increase a tumble flow of intake air flowed into a combustion chamber of an engine from an intake port of a cylinder head of the engine, efforts have been made to improve a shape of a throat portion of the intake port. For example, JP2010-174702A discloses a shape of a throat portion of an intake port in which an edge is formed in a first wall surface (upper wall surface) of the throat portion, and a convexly curved surface is formed closer to a side of a guide hole of a valve stem guide (upstream side) than the edge in the first wall surface. Further, a part of a second wall surface (lower wall surface) of the throat portion near a downstream end thereof is extended toward an extended line of a center axis of the guide hole (a center axis of an intake valve) to form an edge.

Normally, two intake ports are formed for every cylinder. Therefore, it can be considered to form throat portions of the two intake ports to respectively have a shape which would increase a tumble flow of intake air (e.g., the shape in JP2010-174702A) so that a strength of a tumble flow of intake air formed within the combustion chamber when a flow of the intake air into the combustion chamber is assumed to be caused only from one of the two intake ports becomes substantially the same as a strength of a tumble flow formed within the combustion chamber when the flow of the intake air into the combustion chamber is assumed to be caused only from the other intake port.

However, in this case, when the intake air flows into the combustion chamber from both of the intake ports, a mixing performance of the intake air flowed into the combustion chamber from one of the intake ports with the intake air flowed into the same from the other intake port degrades, and, in particular, if the intake air is forcibly induced by a forced induction system, the mixing performance degrades even more. Therefore, especially within a forcibly inducing range of the engine where the intake air is forcibly induced by the forced induction system, the mixing performance of fuel with the intake air degrades and, thus, combustibility of a mixture gas of the fuel and the intake air degrades and it becomes difficult to improve fuel consumption.

SUMMARY

The present invention is made in view of the above situations, and aims to improve the mixing performance of fuel with intake air and improve a fuel consumption of an engine provided with a forced induction system within a forcibly inducing range of the engine.

According to one aspect of the present invention, an intake device of an engine having one or more cylinders is provided. The intake device includes a cylinder head formed with two intake ports per cylinder for flowing intake air into a combustion chamber of the cylinders, and a forced induction system for forcibly inducing the intake air. The two intake ports have respective throat portions, and in each cylinder, one of the two intake ports is designed to have a smaller passage cross-sectional area at its throat portion than a passage cross-sectional area of the throat portion of the other intake port, and to cause a strength of a tumble flow of intake air formed within the combustion chamber when the flow of the intake air into the combustion chamber is assumed to be only from the one of the two intake ports, to be stronger than a strength of a tumble flow of intake air formed within the combustion chamber when the flow of the intake air into the combustion chamber is assumed to be only from the other intake port. A tumble ratio of a flow of the intake air within the combustion chamber is a predetermined value or greater when the intake air is forcibly induced by the forced induction system and flows into the combustion chamber from the two intake ports within an operating range of the engine where the forced induction is performed.

With this configuration, when the intake air is flowed into the combustion chamber from the two intake ports, the stronger tumble flow of the intake air flowed into the combustion chamber from the one of the intake ports becomes easily oriented toward the weaker tumble flow of the intake air flowed into the combustion chamber from the other intake port. Therefore, the mixing performance of the intake air from the two intake ports improves, and as a result, the mixing performance of fuel with the intake air also improves. The strength of the tumble flow of the intake air from the one of the intake ports can easily be obtained by designing the throat portion thereof to have a small passage cross-sectional area or, in addition to this, forming the throat portion into a suitable shape. Further, by designing the throat portion of the other intake port to have a large passage cross-sectional area, a flow amount of the intake air from the other intake port can be increased, and an intake filling amount required within the operating range of the engine where the forced induction is performed (forcibly inducing range) can easily be secured. Thus, in combination with the tumble ratio being the predetermined value or greater, within the forcibly inducing range, a fuel consumption can be improved while increasing an output of the engine.

The predetermined value is preferably 2.

With such a high tumble ratio, within the forcibly inducing range, the mixing performance of the fuel with the intake air significantly improves, and as a result, the fuel consumption can further be improved.

When seen in a center axis direction of each cylinder, the two intake ports of the cylinder may extend to the combustion chamber in a first direction intersecting the center axis direction, and when seen in a second direction perpendicular to the center axis direction and the first direction, the two intake ports may extend on an upper side of the combustion chamber while inclining to a combustion chamber side in the center axis direction, and open to the combustion chamber at opening portions of the intake ports, respectively, the opening portions located in a part of a surface of the cylinder head facing the combustion chamber, on an opposite side from the first direction. In the cylinder head, an intake valve seat having a substantially ring shape and having a sealing surface on an inward side in a radial direction of the intake valve seat, may be attached to the opening portion of the one of the intake ports, and when seen in the second direction, a part of a wall surface of the throat portion of the one of the intake ports may have a shape for guiding intake air flowing near the part of the wall surface, to flow substantially straight toward an area that is on the radially inward side of the sealing surface and near a part of the sealing surface located on the side of the first direction, the part of the wall surface being a part on an opposite side from the combustion chamber in the center axis direction of the cylinder (anti-combustion-chamber-side wall surface). When seen in the second direction, another part of the wall surface of the throat portion of the one of the intake ports may be formed with an edge for orienting the intake air flowing near the other part of the wall surface, toward a center axis of an intake valve for opening and closing the one of the intake ports, the other part of the wall surface being a part on the combustion chamber side in the center axis direction of the cylinder.

With this configuration, when the intake air is flowed into the combustion chamber from the two intake ports, the stronger tumble flow of the intake air flowed into the combustion chamber from the one of the intake ports, becomes easily oriented toward the weaker tumble flow of the intake air flowed into the combustion chamber from the other intake port. Therefore, the mixing performance of the intake air from the two intake ports improves, and as a result, the mixing performance of the fuel with the intake air also improves. Further, the anti-combustion-chamber-side and combustion-chamber-side wall surfaces of the throat portion of the one of the intake ports can be formed into the shape with which the strong tumble flow of the intake air flowed into the combustion chamber from the one of the intake ports can be obtained. Thus, the tumble ratio of the intake air flow within the combustion chamber when the intake air flows into the combustion chamber from the two intake ports can be a high value (2 or greater), and as a result, the fuel consumption can be improved.

The one of the two intake ports of each cylinder may be located on one side of the cylinder with respect to a predetermined plane including the center axis of the cylinder, and the other intake port may be located on the other side of the cylinder. The engine may include, for each cylinder, an ignition plug disposed in the cylinder head, in an extended line of the center axis of the cylinder, a piston fitted into the cylinder and formed with a combustion cavity in a top face of the piston, on the center axis of the cylinder, and a fuel injector for directly injecting fuel into the combustion chamber.

At a center area of the combustion chamber in a direction in which the two intake ports are aligned, the mixing performance of the intake air flowed into the combustion chamber from the one of the intake ports with the intake air flowed into the combustion chamber from the other intake port may degrade. However, by causing the strength of the tumble flow of intake air formed within the combustion chamber when the flow of the intake air into the combustion chamber is assumed to be only from the one of the intake ports, to be stronger than that when the flow of the intake air into the combustion chamber is assumed to be only from the other intake port, the mixing performance of the intake air from the two intake ports improves, and the mixing performance of the fuel directly injected into the combustion chamber with the intake air also improves. Therefore, the mixing performance of the fuel with the intake air within the combustion cavity improves and, thus, combustibility of mixture gas of the fuel and the intake air when it is ignited by the ignition plug improves.

DETAILED DESCRIPTION OF EMBODIMENT

Hereinafter, one embodiment of the present invention is described in detail with reference to the accompanying drawings.

Figure 1:
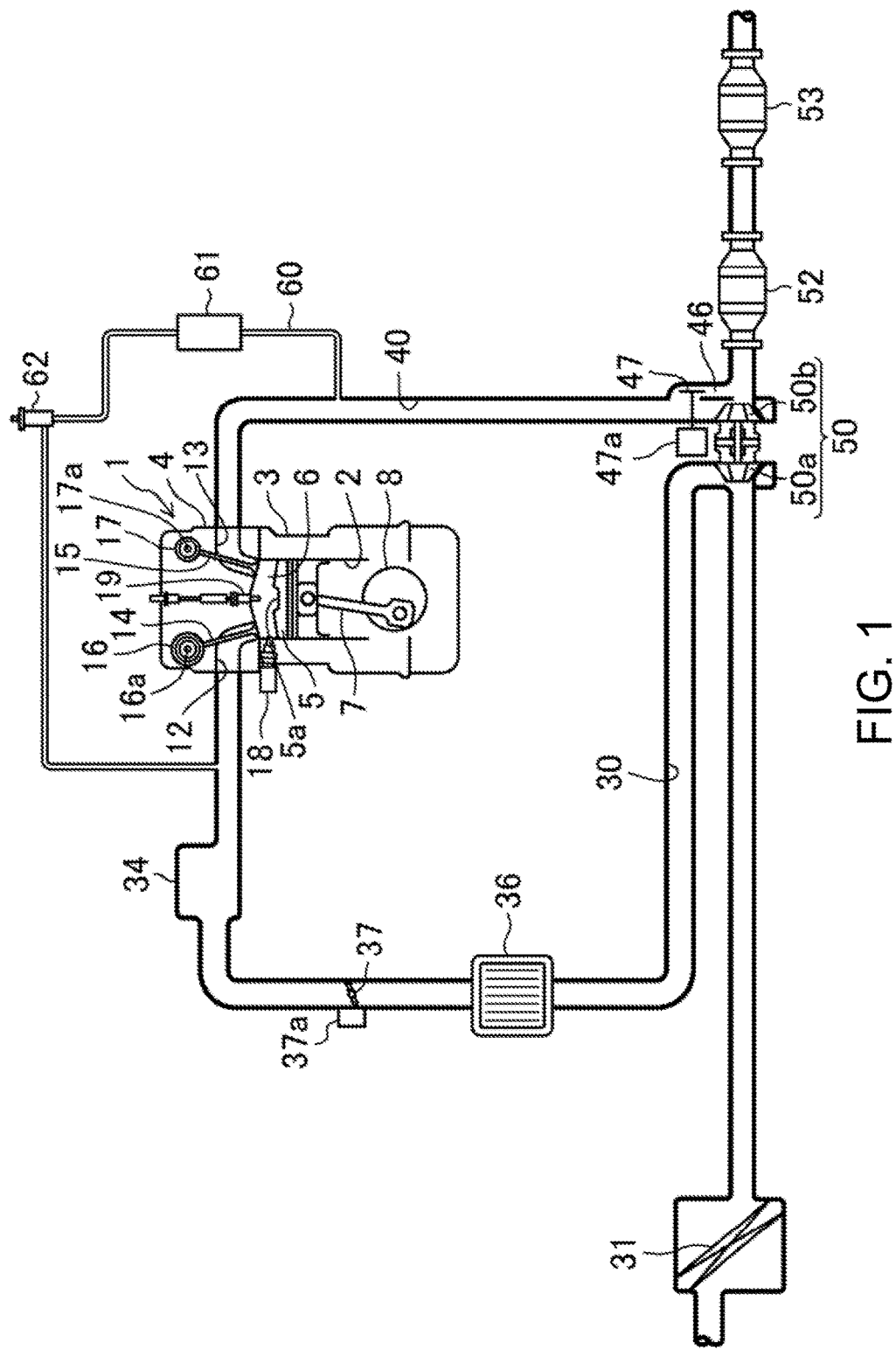
FIG. 1 is a view schematically illustrating an overall configuration of intake and exhaust systems of an engine provided with an intake device according to one embodiment of the present invention.
Figure 2:
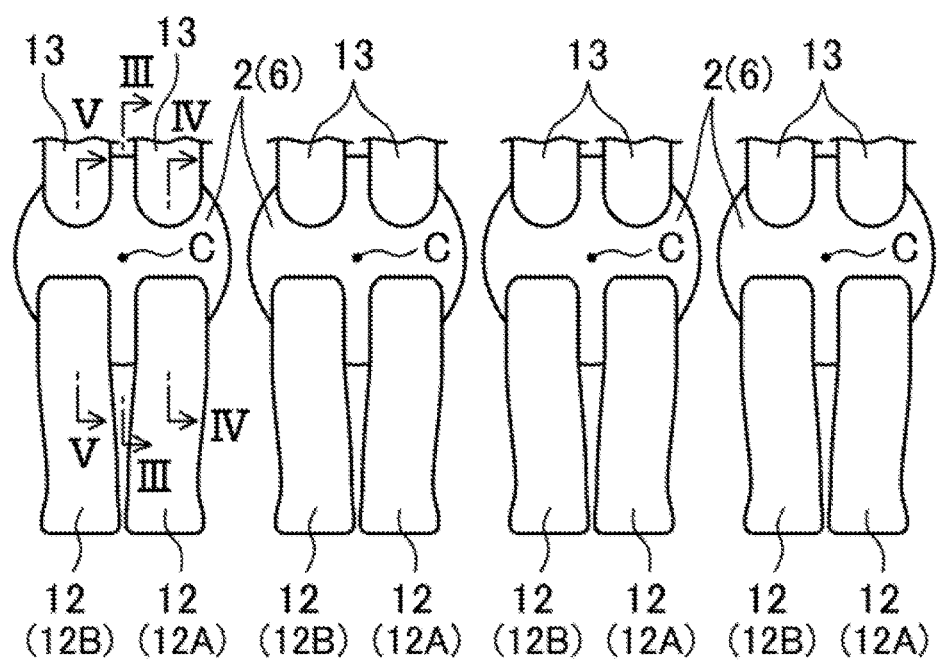
FIG. 2 is a view illustrating four cylinders of the engine and a positional relationship of intake ports with exhaust ports in each of the cylinders, when seen in a center axis direction of the cylinders.

FIG. 1 is a view schematically illustrating an overall configuration of intake and exhaust systems of an engine 1 provided with an intake device according to one embodiment of the present invention. The engine 1 is a multi-cylinder gasoline engine placed transversely in a vehicle and provided with a turbocharger. The engine 1 includes a cylinder block 3 provided with a plurality of cylinders 2 (four cylinders in this embodiment) linearly disposed as illustrated in FIG. 2, and a cylinder head 4 disposed on the cylinder block 3. A reciprocatable piston 5 forming a combustion chamber 6 with the cylinder head 4 therebetween is fitted into each of the cylinders 2 of the engine 1. A combustion cavity 5a (see FIG. 3 for details) is formed in a top face of the piston 5, on a center axis C of the cylinder 2 (see FIGS. 2 to 5). Each of the pistons 5 is coupled via a connecting rod 7 to a crankshaft 8 extending in a direction perpendicular to the drawing sheet of FIG. 1 (i.e., a cylinder aligning direction (left-and-right directions in FIG. 2)). In a state where the engine 1 is on the vehicle, the crankshaft 8 extends in a vehicle width direction.

The cylinder block 3 and the cylinder head 4 are made from aluminum alloy and cast in a mold.

In the cylinder head 4, two intake ports 12 and two exhaust ports 13 are formed for each cylinder 2. In the cylinder head 4, an opening portion of each intake port 12 to the combustion chamber 6 is opened and closed by an intake valve 14, and an opening portion of each exhaust port 13 to the combustion chamber 6 is opened and closed by an exhaust valve 15.

Each intake valve 14 is driven by an intake valve driving mechanism 16 to reciprocate at a predetermined timing, so as to open and close the intake port 12. Each exhaust valve 15 is driven by an exhaust valve driving mechanism 17 to reciprocate at a predetermined timing, so as to open and close the exhaust port 13. Thus, the intake and exhaust valves 14 and 15 exchange gas between the inside and outside of the cylinder 2. The intake and exhaust valve driving mechanisms 16 and 17 have intake and exhaust camshafts 16a and 17a coupled to the crankshaft 8 to be driven thereby, respectively. The camshafts 16a and 17a rotate in synchronization with a rotation of the crankshaft 8. Further, the intake valve driving mechanism 16 includes a hydraulically/mechanically-actuated phase variable mechanism (VVT (Variable Valve Timing)) capable of varying a phase of the intake camshaft 16a within a predetermined angle range.

Figure 3:
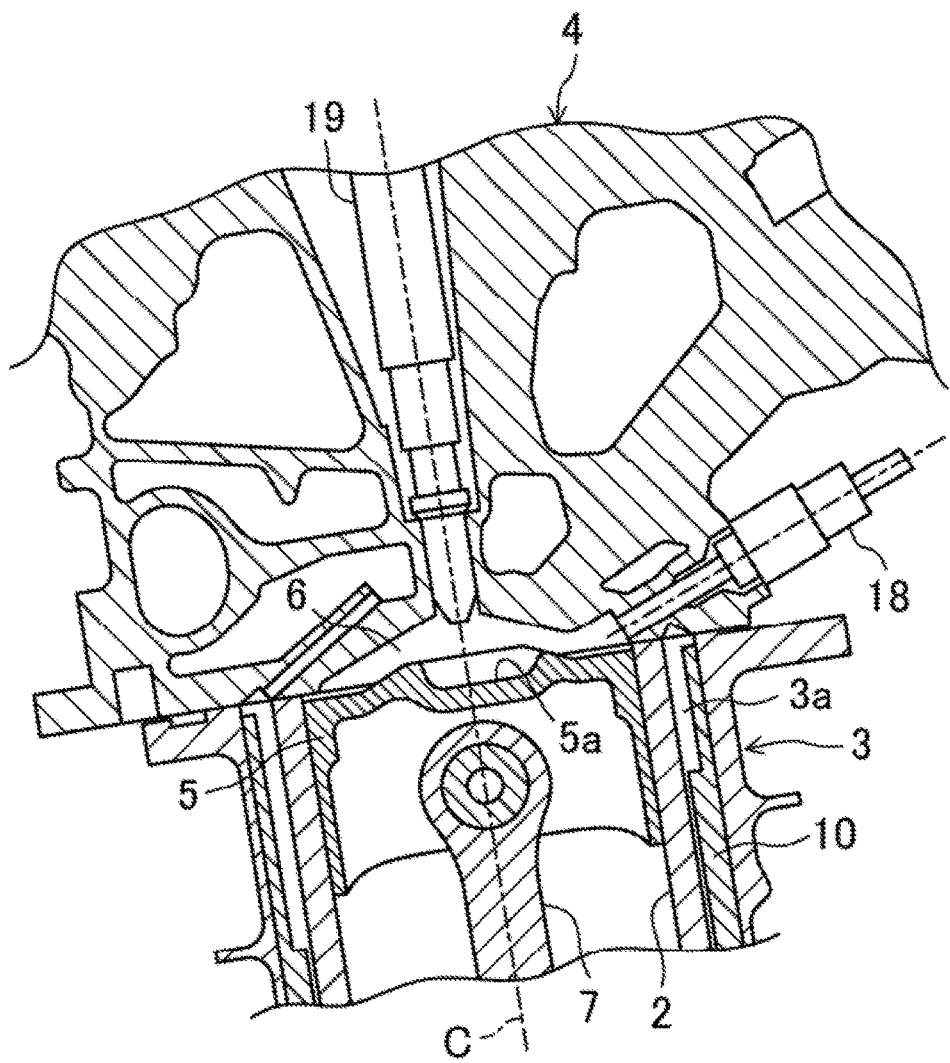
FIG. 3 is a cross-sectional view taken along a line III-III in FIG. 2.

The engine 1 is provided with, for each cylinder 2, a fuel injector 18 for directly injecting fuel into the combustion chamber 6, and an ignition plug 19 for igniting a mixture gas of the fuel and intake air. In FIG. 1, the fuel injector 18 is illustrated as if it is provided at an upper (cylinder head 4 side) end part of the cylinder block 3 for the sake of convenience; however, each fuel injector 18 is actually provided in the cylinder head 4 as illustrated in FIG. 3, more specifically, at a position substantially right between the two intake ports 12 of the corresponding cylinder 2 in the cylinder-row direction. The fuel injector 18 is arranged so that its fuel injection port is oriented toward an inside of the combustion chamber 6, and directly injects the fuel into the combustion chamber 6 near a top dead center of a compression stroke (CTDC).

Each ignition plug 19 is disposed in the cylinder head 4, in an extended line of the center axis C of the cylinder 2 (see FIG. 3). A tip part (electrode) of the ignition plug 19 is located near a ceiling surface of the combustion chamber 6. The ignition plug 19 produces a spark at a predetermined ignition timing and, thus, the mixture gas within the combustion cavity 5a explodes to be combusted.

On one side (left side in FIG. 1) surface of the cylinder head 4, an intake passage 30 is connected to communicate with the two intake ports 12 of the respective cylinders 2. An air cleaner 31 for filtering the intake air is disposed in an upstream end section of the intake passage 30, and the intake air filtered by the air cleaner 31 is sucked into the combustion chambers 6 of the respective cylinders 2 through the intake passage 30 and the intake ports 12. A surge tank 34 is disposed near a downstream end of the intake passage 30. Part of the intake passage 30 downstream of the surge tank 34 is branched to be independent passages extending toward the respective cylinders 2, and downstream ends of the independent passages are connected with the intake ports 12 of the cylinders 2, respectively.

A compressor 50a of a turbocharger 50 is disposed in the intake passage 30, between the air cleaner 31 and the surge tank 34. The intake air is turbocharged by the compressor 50a in operation.

Further, an intercooler 36 for cooling air compressed by the compressor 50a, and a throttle valve 37 are disposed in the intake passage 30 in this order from the upstream side, between the compressor 50a of the turbocharger 50 and the surge tank 34. The throttle valve 37 is driven by a drive motor 37a to change a cross-sectional area of the intake passage 30 at the position where the throttle valve 37 is disposed, so as to adjust an amount of intake air to the combustion chambers 6 of the respective cylinder 2.

On the other side (right side in FIG. 1) surface of the cylinder head 4, an exhaust passage 40 for discharging exhaust gas from the combustion chambers 6 of the respective cylinders 2 is connected. An upstream part of the exhaust passage 40 is comprised of an exhaust manifold having independent passages extending to the respective cylinders 2 and connected with the exhaust ports 13, and a manifold section where the respective independent passages are collected together. In part of the exhaust passage 40 downstream of the exhaust manifold, a turbine 50b of the turbocharger 50 is disposed. The turbine 50b is rotated by a flow of the exhaust gas, and the rotation of the turbine 50b operates the compressor 50a coupled thereto. Note that the intake air may be forcibly induced by an electric forced induction system such as a supercharger instead of the turbocharger 50.

An exhaust bypass passage 46 for guiding the exhaust gas of the engine 1 to flow while bypassing the turbine 50b is provided in the exhaust passage 40. An end part of the exhaust bypass passage 46 on the flow-in side of the exhaust gas is provided with a wastegate valve 47 that is driven by a drive motor 47a. The wastegate valve 47 is controlled according to an operating state of the engine 1. When the wastegate valve 47 is fully closed, the entire exhaust gas flows to the turbine 50b, and when the wastegate valve 47 is not fully closed, a flow rate of the exhaust gas to the exhaust bypass passage 46 (i.e., the flow rate to the turbine 50b) changes according to the opening state of the wastegate valve 47. When the wastegate valve 47 is fully opened, the turbocharger 50 substantially does not operate.

Part of the exhaust passage 40 downstream of the turbine 50b (downstream of a position connected with a downstream end part of the exhaust bypass passage 46) is provided with exhaust emission control catalysts 52 and 53 constructed with an oxidation catalyst, etc., and for purifying hazardous components contained within the exhaust gas. In this embodiment, the two exhaust emission control catalysts of the upstream and downstream exhaust emission control catalysts 52 and 53 are provided; however, it may be such that only one of the upstream and downstream exhaust emission control catalysts 52 and 53 is provided.

Further the engine 1 includes an EGR passage 60 for recirculating part of the exhaust gas from the exhaust passage 40 to the intake passage 30. The EGR passage 60 connects part of the exhaust passage 40 downstream of the exhaust manifold with the independent passages of the intake passage 30 downstream of the surge tank 34. An EGR cooler 61 for cooling the exhaust gas passing therethrough and an EGR valve 62 for adjusting an amount of the exhaust gas recirculated by the EGR passage 60 are disposed in the EGR passage 60.

Figure 4:
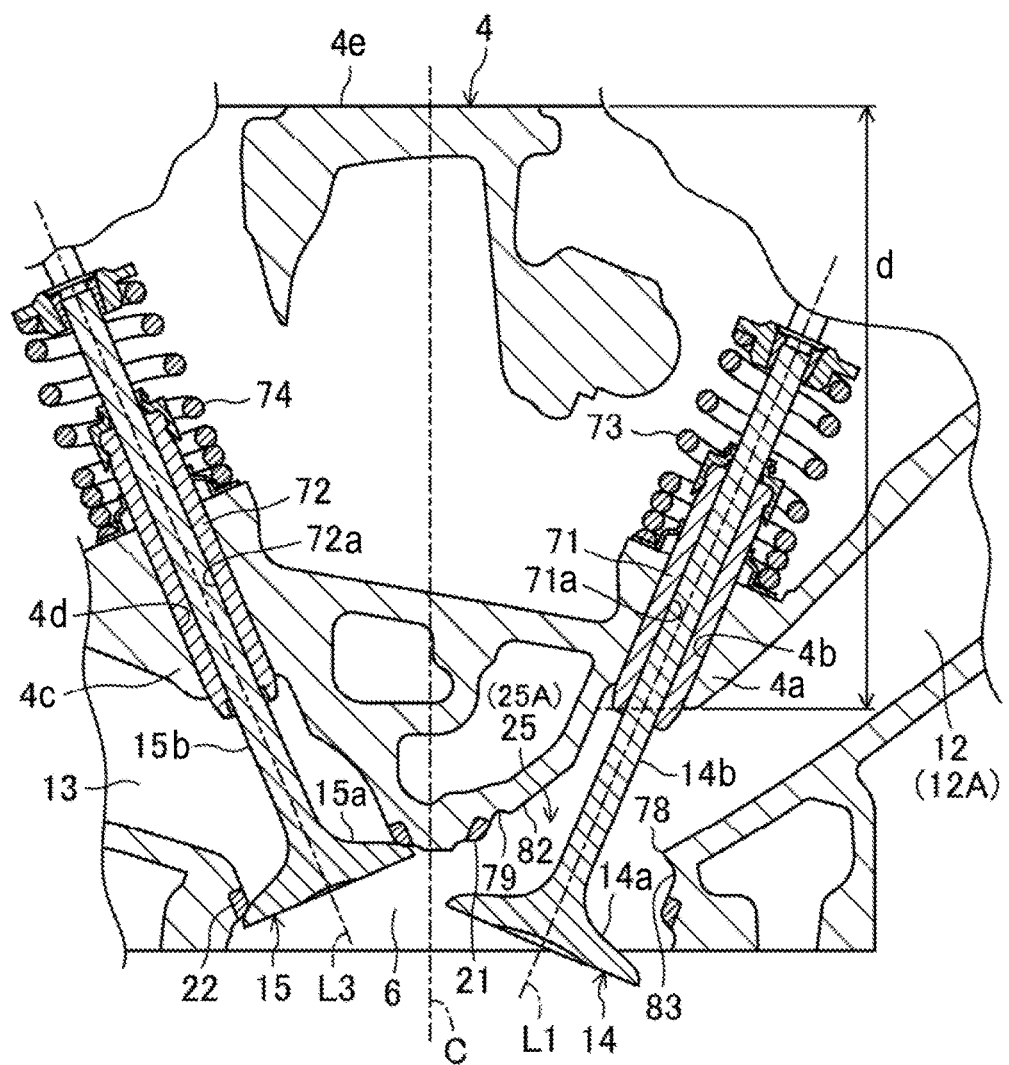
FIG. 4 is a cross-sectional view taken along a line IV-IV in FIG. 2.
Figure 5:
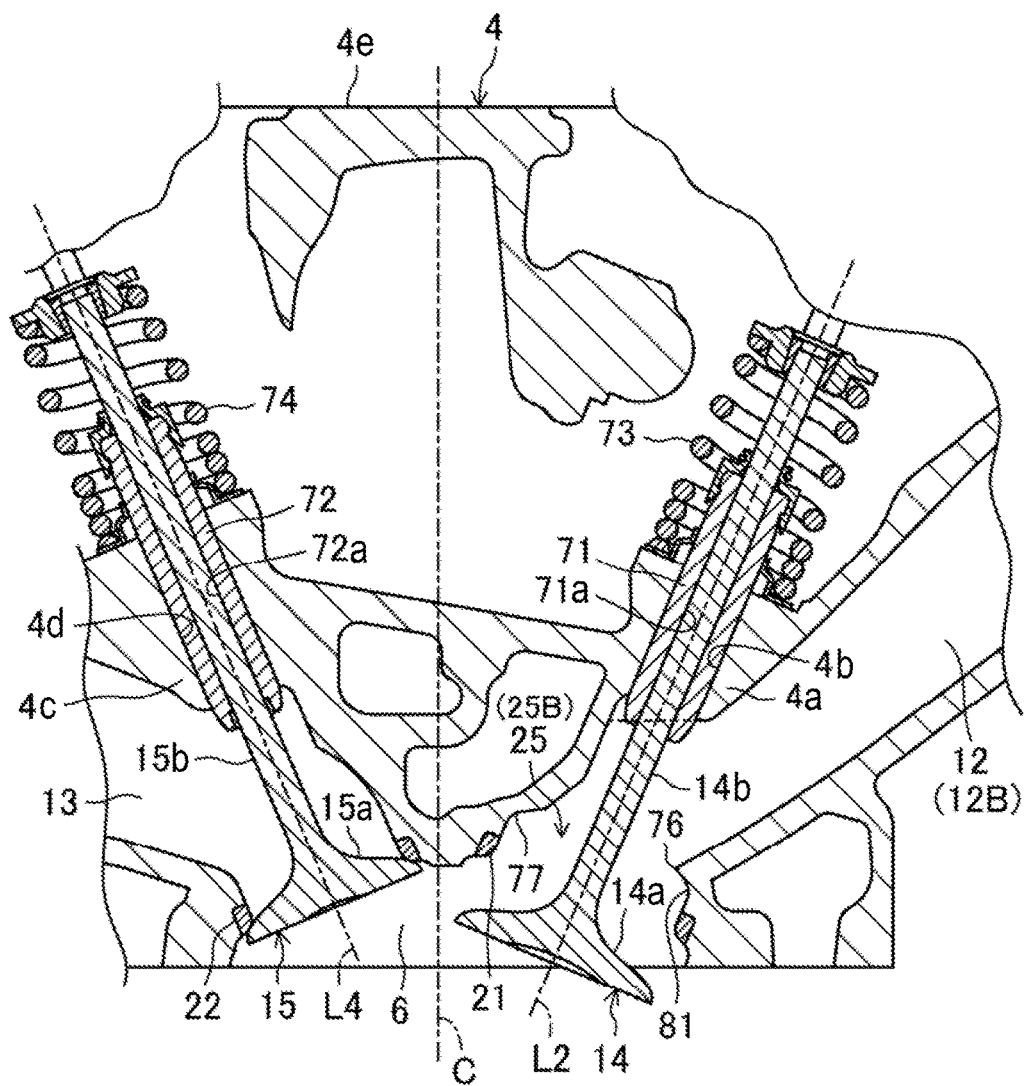
FIG. 5 is a cross-sectional view taken along a line V-V in FIG. 2.

FIG. 3 is a cross-sectional view taken along a line III-III in FIG. 2, specifically, cut along a first plane including the center axis C of the cylinder 2 and perpendicular to the crankshaft 8. FIG. 4 is a cross-sectional view taken along a line IV-IV in FIG. 2, specifically, cut along a second plane parallel to the first plane and including center axes L1 and L3 of the intake and exhaust valves 14 and 15 located at one side of the cylinder with respect to the first plane. FIG. 5 is a cross-sectional view taken along a line V-V in FIG. 2, specifically, cut along a third plane parallel to the first plane and including center axes L2 and L4 of the intake and exhaust valves 14 and 15 located on the other side of the cylinder with respect to the first plane. Note that in FIGS. 3 to 5, the left and right relationship is reversed from FIG. 1, so that the intake ports 12 are on the right side (corresponding to a front side of the vehicle) and the exhaust ports 13 are on the left side (corresponding to a rear side of the vehicle).

As illustrated in FIG. 3, the engine 1 is mounted on the vehicle to slightly slant downward and toward the rear side of the vehicle (left side in FIG. 3). Note that only in FIG. 3, the engine 1 is illustrated in the slanted state (in a state where the center axis C of the cylinder 2 is inclined with respect to up-and-down directions of the vehicle), and in FIGS. 4 to 9, 11, and 12, the engine 1 is illustrated in a state where the center axis C of the cylinder 2 extends in the up-and-down directions. Further, the reference character "3a" in FIG. 3 indicates a water jacket of the cylinder block 3, and the reference character "10" indicates a water jacket spacer disposed within the water jacket 3a.

As illustrated in FIGS. 2, 4, and 5, when seen in the direction of the center axis C of the cylinder 2, the two intake ports 12 of each cylinder 2 extend to the combustion chamber 6 in a first direction intersecting the center axis C direction (in this embodiment, a direction perpendicular to the crankshaft 8 (leftward direction in FIGS. 4 and 5)), and when seen in a second direction perpendicular to the center axis C of the cylinder 2 and the first direction (i.e., in the crankshaft 8 direction (in FIGS. 4 and 5), the two intake ports 12 of each cylinder 2 extend on an upper side of the combustion chamber while inclining to the combustion chamber 6 side in the center axis C direction of the cylinder 2, and open to the combustion chamber 6 at the opening portions thereof, respectively, the opening portions located in a part of the surface of the cylinder head 4 facing the combustion chamber 6 (the ceiling surface of the combustion chamber 6), on an opposite side from the first direction (right side in FIGS. 4 and 5).

The two intake ports 12 of each cylinder 2 are located on both sides of the cylinder with respect to a predetermined plane including the center axis C of the cylinder 2. In this embodiment, the predetermined plane is the first plane including the center axis C of the cylinder 2 and perpendicular to the crankshaft 8. Thus, the two intake ports 12 of each cylinder 2 extend along the first plane.

The two exhaust ports 13 of each cylinder 2 extend toward the combustion chamber 6 in a direction opposite to the first direction and, when seen in the crankshaft 8 direction (in FIGS. 4 and 5), the two exhaust ports 13 of each cylinder 2 extend in the opposite direction on an upper side of the combustion chamber while inclining to the combustion chamber 6 side in the center axis C direction of the cylinder 2, and open to the combustion chamber 6 at the opening portions thereof, respectively, the opening portions located in a part of the surface of the cylinder head 4 facing the combustion chamber 6 (the ceiling surface of the combustion chamber 6), on the side of the first direction (left side in FIGS. 4 and 5).

As illustrated in FIGS. 4 and 5, an intake valve seat 21 having substantially a ring shape is attached to the cylinder head 4 to be fixed to each of the opening portions of the intake ports 12 to the combustion chamber 6. The intake valve seat 21 has a sealing surface in an inner circumferential surface thereof, and the intake valve 14 has a sealing surface near a circumferential portion of an umbrella-shaped part 14a thereof. When the sealing surface of the intake valve 14 contacts with the sealing surface of the intake valve seat 21, the intake port 12 becomes a closed state. Similarly, an exhaust valve seat 22 having substantially a ring shape is attached to the cylinder head 4 to be fixed to each of the opening portions of the exhaust ports 13 to the combustion chamber 6. The exhaust valve seat 22 has a sealing surface in an inner circumferential surface thereof, and the exhaust valve 15 has a sealing surface near a circumferential portion of an umbrella-shaped part 15a thereof. When the sealing surface of the exhaust valve 15 contacts with the sealing surface of the exhaust valve seat 22, the exhaust port 13 becomes a closed state.

The intake valve 14 has the umbrella-shaped part 14a and a circular-column-shaped stem 14b extending through a throat portion 25 of the intake port 12 (a portion adjacent to the intake valve seat 21 on the upstream side), from the umbrella-shaped part 14a to a side away from the combustion chamber 6. When seen in the crankshaft 8 direction (in FIGS. 4 and 5), the cylinder head 4 is formed with a guide member supporting portion 4a in a wall part of the intake port 12, near the upstream side of the throat portion 25 of the intake port 12 and on an opposite side from the combustion chamber 6 in the center axis C direction of the cylinder 2. The guide member supporting portion 4a is formed with a guide member hole 4b. An intake valve guide member 71 having a cylindrical shape is inserted into the guide member hole 4b and fixed thereto. A guide hole 71a is formed in the intake valve guide member 71 to penetrate a center portion thereof in its center axis direction. When seen in the crankshaft 8 direction (in FIGS. 4 and 5), a center axis of the guide hole 71a extends to the opposite side from the combustion chamber 6 in the center axis C direction of the cylinder 2 while inclining away from the center axis C direction of the cylinder 2. The stem 14b of the intake valve 14 is inserted into the guide hole 71a of the intake valve guide member 71 from the lower side, so as to extend to the side (upper side) where the intake valve driving mechanism 16 is disposed. Thus, the intake valve 14 is guided by the guide hole 71a of the intake valve guide member 71 to be movable in the center axis direction of the guide hole 71a (i.e., the center axis direction of the intake valve 14 (the center axis L1 direction in FIG. 4, and the center axis L2 direction in FIG. 5)). When the intake valve 14 is pushed downward by the intake valve driving mechanism 16, the intake port 12 becomes an open state (see FIGS. 4 and 5), and when the intake valve 14 is no longer pushed by the intake valve driving mechanism 16, the intake valve 14 is moved upward by a compression coil spring 73 and, thus, the intake port 12 becomes the closed state.

Similar to the intake valve 14, the exhaust valve 15 has the umbrella-shaped part 15a and a circular-column-shaped stem 15b extending through an upstream portion of the exhaust port 13, from the umbrella-shaped part 15a to an opposite side from the combustion chamber 6. When seen in the crankshaft 8 direction (in FIGS. 4 and 5), the cylinder head 4 is formed with a guide member supporting portion 4c in a wall part of the exhaust port 13, on the opposite side from the combustion chamber 6 in the center axis C direction of the cylinder 2. The guide member supporting portion 4c is formed with a guide member hole 4d. An exhaust valve guide member 72 having a cylindrical shape is inserted into the guide member hole 4d and fixed thereto. A guide hole 72a is formed in the exhaust valve guide member 72 to penetrate a center portion thereof in its center axis direction. When seen in the crankshaft 8 direction, a center axis of the guide hole 72a extends to the opposite side from the combustion chamber 6 in the center axis C direction of the cylinder 2 while inclining away from the center axis C of the cylinder 2. The stem 15b of the exhaust valve 15 is inserted into the guide hole 72a of the exhaust valve guide member 72 from the lower side, so as to extend to the side (upper side) where the exhaust valve driving mechanism 17 is disposed. Thus, the exhaust valve 15 is guided by the guide hole 72a of the exhaust valve guide member 72 to be movable in the center axis direction of the guide hole 72a (i.e., the center axis direction of the exhaust valve 15 (the center axis L3 direction in FIG. 4, and the center axis L4 direction in FIG. 5)). When the exhaust valve 15 is pushed downward by the exhaust valve driving mechanism 17, the exhaust port 13 becomes an open state, and when the exhaust valve 15 is no longer pushed by the exhaust valve driving mechanism 17, the exhaust valve 15 is moved upward by a compression coil spring 74 and, thus, the exhaust port 13 becomes the closed state (see FIGS. 4 and 5).

In each cylinder 2, one of the two intake ports 12 (the intake port 12 on the right side in FIG. 2 (the intake port 12 in FIG. 4)) is designed to have a smaller passage cross-sectional area at the throat portion 25 than that in the other intake port 12 (the intake port 12 on the left side in FIG. 2 (the intake port 12 in FIG. 5)), and to cause a strength of a tumble flow of intake air formed within the combustion chamber 6 when the flow of the intake air into the combustion chamber 6 is assumed to be caused only from the one of the two intake ports 12, to be stronger than a strength of a tumble flow formed within the combustion chamber 6 when the flow of the intake air into the combustion chamber 6 is assumed to be caused only from the other intake port 12. Note that the intake port 12 on the left side in each cylinder 2 in FIG. 2 may be the one of the two intake ports 12 and the intake port 12 on the right side may be the other intake port 12.

Hereinafter, when differentiating the two intake ports 12 from each other, the one of the two intake ports 12 is referred to as the first intake port 12A and the other intake port 12 is referred to as the second intake port 12B, and when the differentiation is not necessary, the intake ports 12 may simply be referred to as the intake ports 12. Further, the throat portion of the first intake port 12A is referred to as the throat portion 25A and the throat portion of the second intake port 12B is referred to as the throat portion 25B. When differentiation of the throat portions 25A and 25B is not necessary, they may simply be referred to as the throat portions 25. The throat portions 25 of the first intake port 12A and the second intake port 12B are formed to be adjacent to the sealing surface of the intake valve seat 21 which is in contact with the sealing surface of the intake valve 14, and are shaped portions wherein the passage cross-sectional areas of the intake ports are reduced in dimension. The throat parts 25 are machined into predetermined shapes with tools as described later.

In this embodiment, the throat portion 25A of the first intake port 12A not only has the smaller passage cross-sectional area than the throat portion 25B of the second intake port 12B, but also has a difference, compared to the throat portion 25B of the second intake port 12B, in the shape of an anti-combustion-chamber-side wall surface that is a part of a wall surface of the throat portion 25 located on the opposite side from the combustion chamber 6 in the center axis C direction of the cylinder 2 (upper side) when seen in the second direction, so that the tumble flow of the intake air from the first intake port 12A becomes significantly stronger than that from the second intake port 12B. The anti-combustion-chamber-side wall surface of the first intake port 12A corresponds to a first machining section 82 described later.

Here, the two intake ports 12 of each cylinder 2 are formed when casting the cylinder head 4, by using a single intake port core for each intake port 12. After the casting, the throat portions 25 of the two intake ports 12 of each cylinder 2 are machined by tools (a tool 91 and first and second tools 92 and 93 described later).

Figure 6:
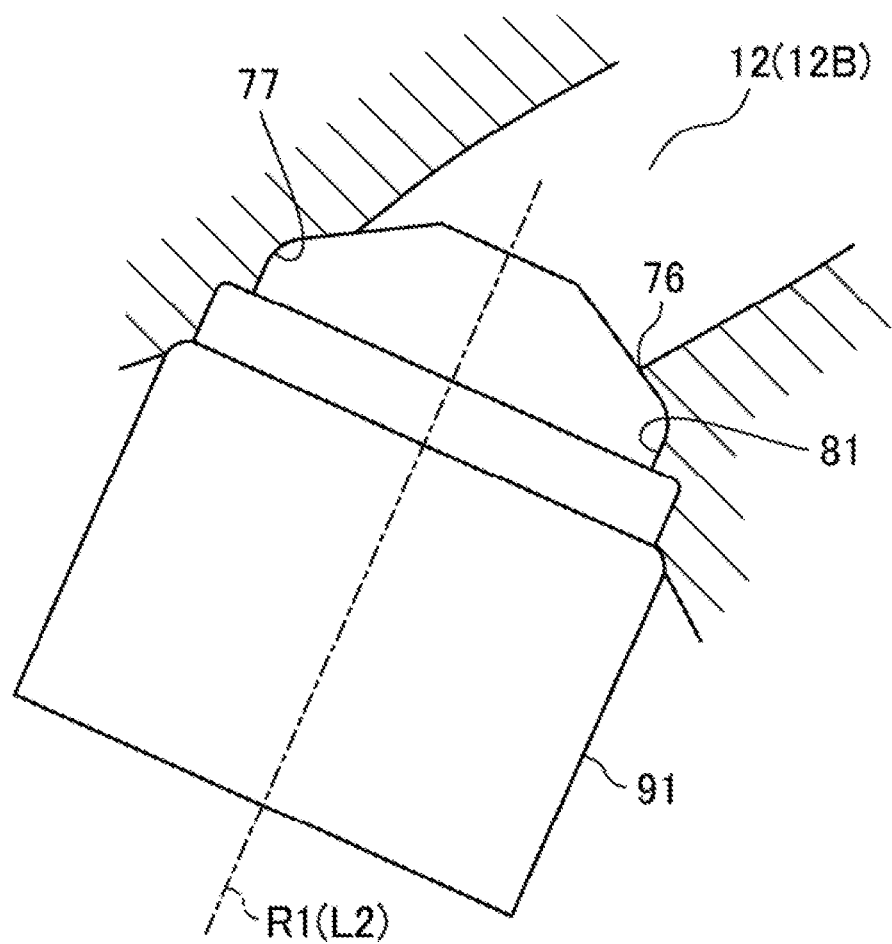
FIG. 6 is a view illustrating a tool for machining a throat portion of a second intake port.

The throat portion 25B of the second intake port 12B is, as illustrated in FIG. 6, machined by the single tool 91. The tool 91 is a rotary tool and machines the throat portion 25B of the second intake port 12B by being inserted into the second intake port 12B in the center axis L2 of the intake valve 14 from the opening portion thereof in a state where a rotation axis R1 of the tool 91 is matched with the center axis L2 of the intake valve 14 for opening and closing the opening portion of the second intake port 12B of the cylinder head 4 to the combustion chamber 6. By the machining, in a combustion-chamber-side wall surface that is a part of the wall surface of the throat portion 25B of the second intake port 12B located on the combustion chamber 6 side in the center axis C direction of the cylinder 2 (lower side) when seen in the crankshaft 8 direction (in FIGS. 5 to 7), an edge 76 for orienting the intake air flowing near the combustion-chamber-side wall surface of the throat portion 25B of the second intake port 12B, toward the center axis L2 of the intake valve 14 is formed.

The edge 76 is an edge that sharply enlarges the passage cross-sectional area of the throat portion 25B of the second intake port 12B, and has a shape in which the combustion-chamber-side wall surface of the throat portion 25B is sharply bent to the combustion chamber 6 side when seen in the crankshaft 8 direction. The edge angle θ (see FIG. 7) is between 80° and 90°, for example. As indicated by the two-dotted chain line in FIG. 7, if the combustion-chamber-side wall surface is bent to have an edge angle θ' that is a blunt angle when seen in the crankshaft 8 direction, part of the intake air near the combustion-chamber-side wall surface of the throat portion 25B flows along the bent surface toward a portion of the umbrella-shaped part 14a of the intake valve 14 on the opposite side from the first direction (see the dashed arrow 86' in FIG. 7). Thus, the flow of this part of the intake air becomes opposite to the tumble flow to be generated within the combustion chamber 6. On the other hand, when seen in the crankshaft 8 direction, by designing the edge angle θ to be a sharp angle (within the angle range described above, or there-below), the intake air flowing near the combustion-chamber-side wall surface of the throat portion 25B is oriented toward the center axis L2 of the intake valve 14 (see the arrow 86) without flowing toward the portion of the umbrella-shaped part 14a of the intake valve 14 on the opposite side from the first direction. Thus, the edge 76 has a function to increase the tumble flow of the intake air from the second intake port 12B.

Figure 7:
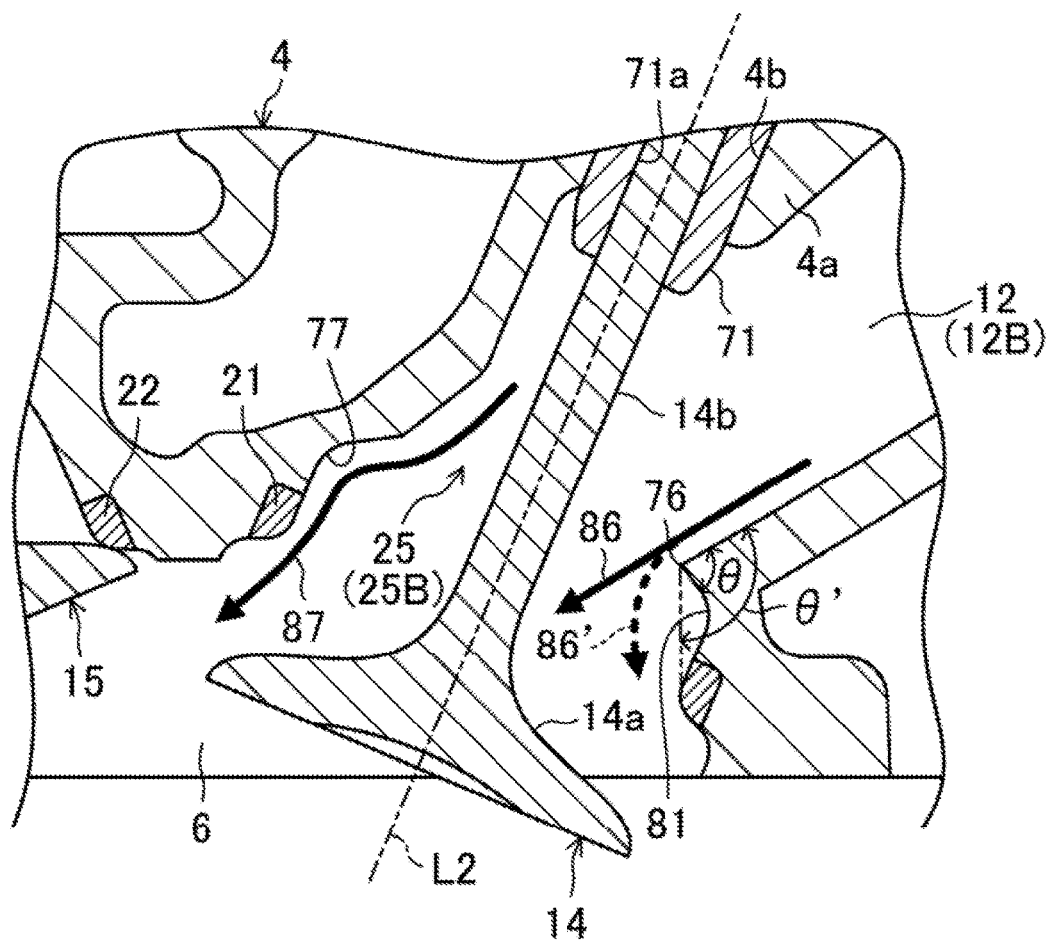
FIG. 7 is an enlarged view of a substantial part of FIG. 5, illustrating a flow of intake air from the throat portion of the second intake port to an opening portion thereof to a combustion chamber.

By machining the throat portion 25B with the single tool 91 as described above, the edge 76 described above can be formed in the combustion-chamber-side wall surface of the throat portion 25B, and additionally, the anti-combustion-chamber-side wall surface of the throat portion 25B is also machined by the tool 91 at the same time. Thus, a comparatively large concave portion 77 is formed as illustrated in FIGS. 5 to 7. With such a concave portion 77, when seen in the crankshaft 8 direction, the intake air near the anti-combustion-chamber-side wall surface of the throat portion 25B flows along the concave portion 77 (see the arrow 87 in FIG. 7), and as a result, a flow of the intake air from the throat portion 25B toward a position that is in an upper (cylinder head 4 side) end section of the combustion chamber 6 and on the side of the first direction changes slightly downward. Thus, the concave portion 77 has a function to reduce the tumble flow of the intake air from the second intake port 12B. The influence of the concave portion 77 on the tumble flow is stronger than the influence of the edge 76 on the tumble flow, and as a result, the tumble flow of the intake air from the second intake port 12B basically becomes weak.

Figure 8:
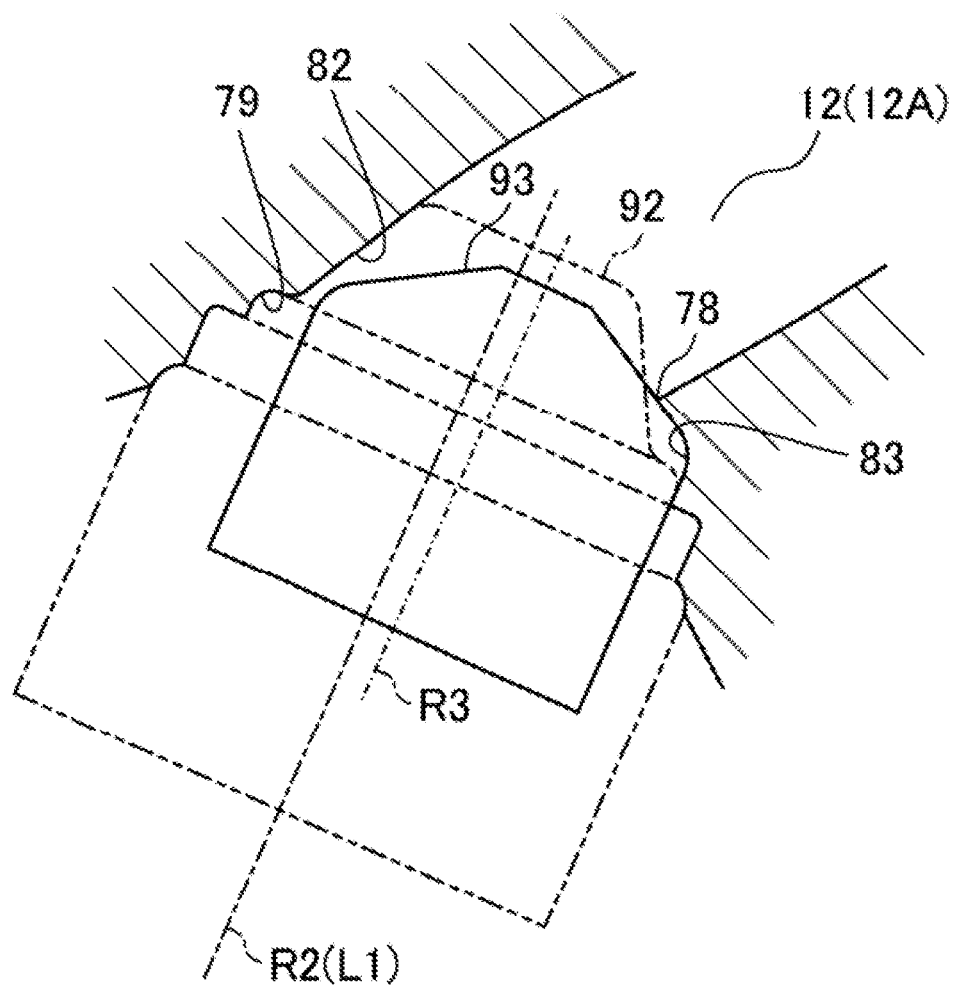
FIG. 8 is a view illustrating first and second tools for machining a throat portion of a first intake port.

The throat portion 25A of the first intake port 12A is machined by the first and second tools 92 and 93 having different shapes, as illustrated in FIG. 8. The first tool 92 indicated by the two-dotted chain line is a rotary tool for machining the anti-combustion-chamber-side wall surface of the throat portion 25A of the first intake port 12A. The second tool 93 is a rotary tool for machining the combustion-chamber-side wall surface of the throat portion 25A of the first intake port 12A located on the combustion chamber 6 side (lower side) in the center axis C direction of the cylinder 2, and forms an edge 78 in the combustion-chamber-side wall surface similar to the edge 76 formed in the throat portion 25B of the second intake port 12B. By the edge 78 formed by the second tool 93, when seen in the crankshaft 8 direction, the intake air flowing near the combustion-chamber-side wall surface of the throat portion 25A of the first intake port 12A is oriented toward the center axis L1 of the intake valve 14 (see the arrow 88 in FIG. 9) for opening portion and closing the opening portion of the first intake port 12A of the cylinder head 4 to the combustion chamber 6.

To avoid machining the anti-combustion-chamber-side wall surface of the throat portion 25A of the first intake port 12A, a rotation axis R3 of the second tool 93 is offset toward the combustion-chamber-side wall surface of the throat portion 25A from the center axis L1 of the intake valve 14 (see FIG. 8) when seen in the crankshaft 8 direction, and the second tool 93 does not contact with the anti-combustion-chamber-side wall surface of the throat portion 25A. Thus, the second tool 93 machines the combustion-chamber-side wall surface of the throat portion 25A of the first intake port 12A by being inserted into the first intake port 12A from the opening portion to the combustion chamber 6, while moving in the center axis L1 in a state where the second tool 93 is offset from the center axis L1 of the intake valve 14.

The rotation axis R2 of the first tool 92, in this embodiment, is matched with the center axis L1 of the intake valve 14, and in this state, the first tool 92 is inserted into the first intake port 12A from the opening portion to the combustion chamber 6 while moving in the center axis L1 of the intake valve 14. Thus, the anti-combustion-chamber-side wall surface of the throat portion 25A of the first intake port 12A is machined by the first tool 92. Note that when seen in the crankshaft 8 direction, the rotation axis R2 of the first tool 92 may be offset from the center axis L1 of the intake valve 14 toward the anti-combustion-chamber-side wall surface of the throat portion 25A.

Hereinafter, in the throat portion 25A of the first intake port 12A, the anti-combustion-chamber-side wall surface machined by the first tool 92 may be referred to as the first machining section 82, and the combustion-chamber-side wall surface machined by the second tool 93 may be referred to as the second machining section 83.

The machining of the second machining section 83 by the second tool 93 may be performed before or after the machining of the first machining section 82 by the first tool 92. In a case where the machining of the first machining section 82 by the first tool 92 is performed first, although the portion to be the second machining section 83 is slightly machined by the first tool 92 at this point, through the machining by the second tool 93 performed thereafter, the second machining section 83 will have its complete shape. If the machining of the second machining section 83 by the second tool 93 is performed first, the first tool 92 does not machine the second machining section 83 after machined by the second tool 93.

Figure 9:
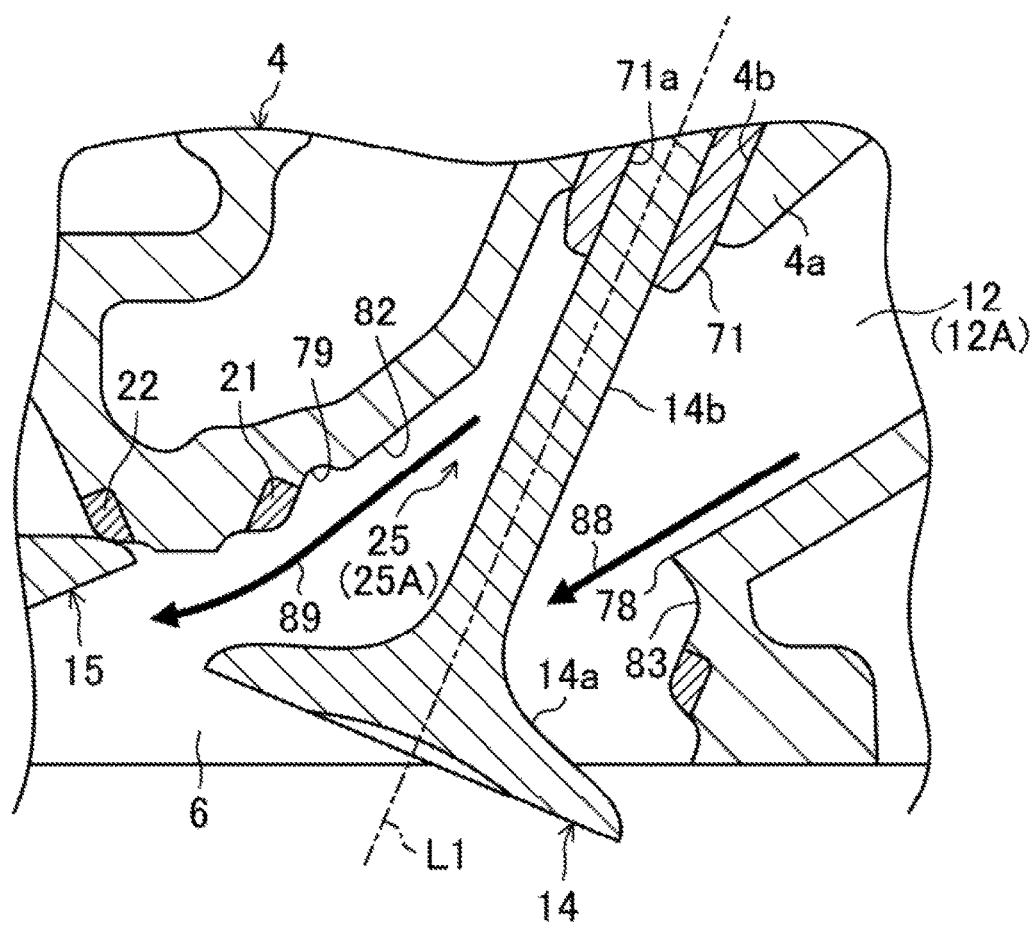
FIG. 9 is an enlarged view of a substantial part of FIG. 4, illustrating a flow of intake air from the throat portion of the first intake port to an opening portion thereof to the combustion chamber.

By the machining of the first machining section 82 by the first tool 92, when seen in the crankshaft 8 direction (in FIGS. 4, 8, and 9), the anti-combustion-chamber-side wall surface of the throat portion 25A of the first intake port 12A extends substantially straight toward a part that is in the sealing surface of the intake valve seat 21 attached to the opening portion of the first intake port 12A of the cylinder head 4 to the combustion chamber 6 and is on the side of the first direction. Note that as illustrated in FIGS. 4, 8, and 9, the anti-combustion-chamber-side wall surface has a small concave portion 79. The concave portion 79, different from the concave portion 77 formed in the anti-combustion-chamber-side wall surface of the throat portion 25B of the second intake port 12B, has a small opening area and a shallow depth so as not to influence the flow of the intake air. Therefore, even with such a concave portion 79, when seen in the crankshaft 8 direction, the intake air near the anti-combustion-chamber-side wall surface of the throat portion 25A of the first intake port 12A flows substantially straight toward an area that is on an inward side of the sealing surface in a radial direction of the intake valve seat 21 and near the part of the sealing surface of the intake valve seat 21 on the side of the first direction (left side in FIG. 9) (see the arrow 89 in FIG. 9). In other words, when seen in the crankshaft 8 direction, the anti-combustion-chamber-side wall surface of the throat portion 25A of the first intake port 12A (first machining section 82) has a shape for guiding the intake air flowing near the anti-combustion-chamber-side wall surface of the throat portion 25A of the first intake port 12A, to flow substantially straight toward the area that is on the radially inward side of the sealing surface and near the part of the sealing surface of the intake valve seat 21 on the side of the first direction. When seen in the crankshaft 8 direction, the intake air which has reached this area smoothly flows, from the opening portion, toward the position of the upper end section of the combustion chamber 6 on the side of the first direction, and then further flows downward of the combustion chamber 6. Thus, a strong tumble flow of which a positive direction is a counter-clockwise direction in FIG. 9 is formed (see FIG. 11).

In this embodiment, as described above, the tumble flow of the intake air within the combustion chamber 6 when the flow of the intake air into the combustion chamber 6 is assumed to be caused only from the first intake port 12A is increased so that a tumble ratio of the intake air flow within the combustion chamber 6 when the intake air turbocharged by the turbocharger 50 within a turbocharging range of the engine 1 (an operating range of the engine 1 where the turbocharging is performed) flows into the combustion chamber 6 from the first and second intake ports 12A and 12B becomes a predetermined value or greater. The predetermined value is preferably 2.

The tumble ratio is a value obtained by dividing, with an angular speed $\omega_c$ of the crankshaft 8, an angular speed $\omega$ of the intake air around an axis that is parallel to the crankshaft 8 passing through a center of gravity of the combustion chamber 6 (the position of the center of gravity changes according to a change in volume of the combustion chamber 6). The angular speed ω of the intake air is obtained as follows. That is, for every predetermined minute crank angle within a predetermined angle range corresponding to a period from a start of an intake stroke until an end of a compression stroke, the inside of the combustion chamber 6 is divided into multiple minute sections, and an angular momentum L of a point mass (air) around the parallel axis in each minute section and a moment of inertia I of the point mass in each minute section are obtained. Then, a total value of the angular momentums L over all the minute sections is obtained for every predetermined minute crank angle, and the total values of the angular momentums L for the predetermined angle range are multiplied by each other to obtain a first value. A total value of the moments of inertia I over all the minute sections is obtained for every predetermined minute crank angle, and the total values of the moments of inertia I for the predetermined angle range are multiplied by each other to obtain a second value. The first value is divided by the second value, and thus, the angular speed ω of the intake air is obtained.

As described above, the two intake ports 12 of each cylinder 2 are formed in casting the cylinder head 4, by using the single intake port core for each intake port 12. The installation positions of the intake port cores inside a casting mold vary. The variation of the installation positions (i.e., positional variation of the intake ports 12 caused by a manufacturing error) causes an influence on the strength of the tumble flow. Specifically, due to the variation of the installation positions, the positions of the first intake ports 12A (particularly at or near the throat portions 25A) inside the cylinder head 4 in the center axis C direction vary, and due to this positional variation, the direction of the flow of the intake air into the combustion chamber 6 changes and the strength of the tumble flow changes.

Therefore, in this embodiment, before the machining of the first machining section 82 by the first tool 92, a distance d in the center axis C direction of the cylinder 2, between a predetermined reference surface of the cylinder head 4 (in this embodiment, a head cover attaching surface 4*e* as described later) and a predetermined section provided at an intermediate portion of the first intake port 12A in a longitudinal direction of the first intake port 12A which is to be machined by the first tool 92, is measured (see FIG. 4).

In this embodiment, the predetermined reference surface of the cylinder head 4 is the head cover attaching surface 4*e* (an end surface on the opposite side from the combustion chamber 6) which is the first place to be cut after the cylinder head 4 is cast. The head cover attaching surface 4*e* is a plane perpendicular to the center axis C of the cylinder 2. Although the predetermined reference surface may be any surface of the cylinder head 4, it is preferably a plane formed by cutting and perpendicular to the center axis C of the cylinder 2. A joining surface 100 of the cylinder head 4 to the cylinder block 3 (see FIG. 13), which is such a plane, may alternatively be the predetermined reference surface, and as described later in detail, a material reference surface 101 (see FIG. 13) may also be the predetermined reference surface.

The predetermined section is preferably in one of a wall part of the cylinder head 4 constituting a wall surface of or near the throat portion 25A of the first intake port 12A, and a part near the wall part. In this embodiment, an end surface of the guide member supporting portion 4*a* on the combustion chamber 6 side, which is formed in the wall part near the upstream side of the throat portion 25A of the first intake port 12A and on the opposite side from the combustion chamber 6 in the center axis C direction of the cylinder 2, is the predetermined section. Immediately after the casting, the predetermined section is substantially parallel to the predetermined reference surface (head cover attaching surface 4*e*) as indicated by the dashed line in FIG. 4, to make the distance d easy to measure. After measuring the distance d, the predetermined section is made into a plane perpendicular to the stem 14*b* of the intake valve 14 by cutting.

Figure 10:
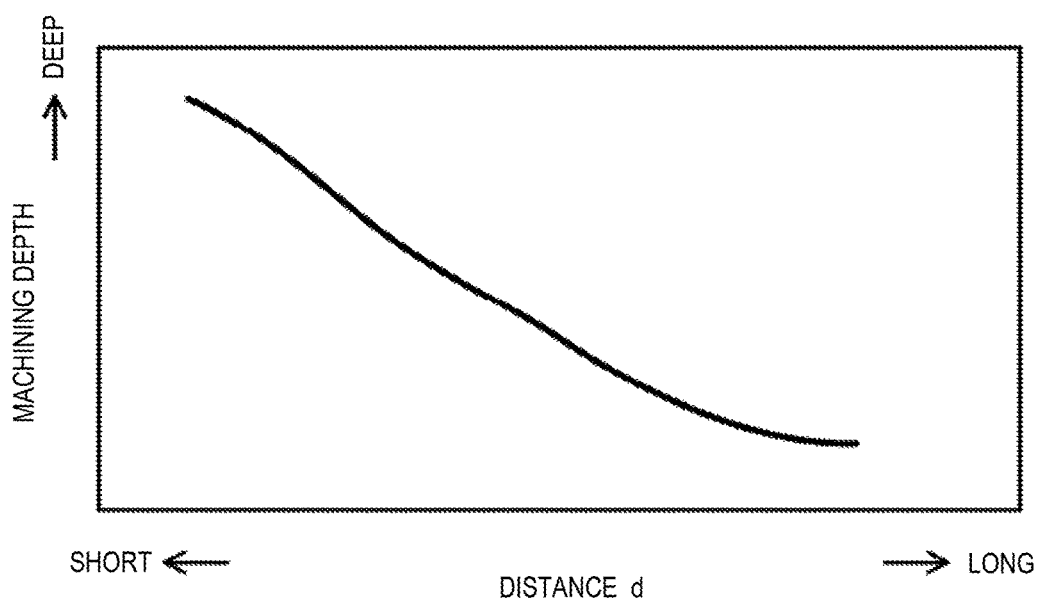
FIG. 10 is a chart illustrating a relationship between a distance d and a machining depth of a first machining section in a first tool inserting direction, the distance d taken in the center axis direction of the cylinder between a head cover attaching surface as a predetermined reference surface of a cylinder head and a predetermined section in the first intake port which is machined by the first tool.

Based on the measurement result of the distance d regarding the first intake port 12A, a machining depth of the first machining section 82 of the throat portion 25A of the first intake port 12A in a first tool inserting direction is adjusted. That is, the machining depth of the first machining section 82 in the first tool inserting direction is a depth adjusted based on the distance d. Specifically, as illustrated in FIG. 10, the machining depth is adjusted to be deeper as the distance d is shorter. In other words, when the distance d is short, the throat portion 25A of the first intake port 12A in the cylinder head 4 is located far from the combustion chamber 6, and therefore, the first tool 92 is inserted deeper to increase the machining depth.

Figure 11:
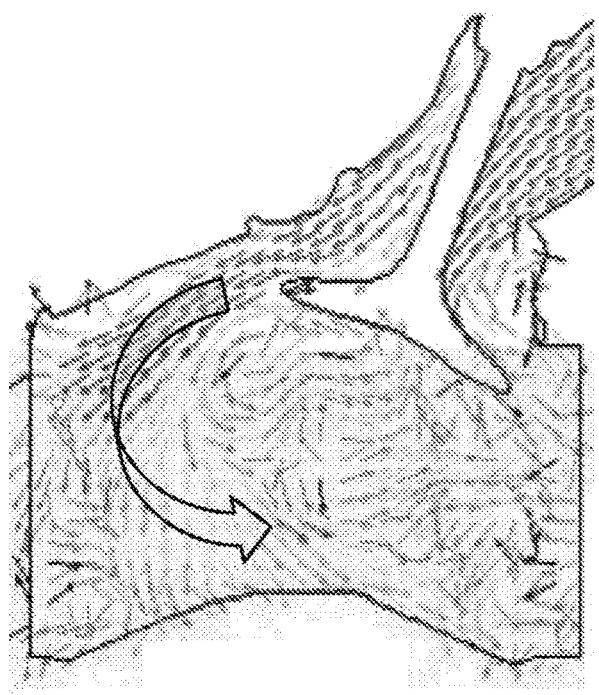
FIG. 11 is a view illustrating a result from analyzing a flow of the intake air flowed into the combustion chamber from the first intake port in a case where the machining depth is adjusted based on the distance d when variation of the distance d is at a lower limit.
Figure 12:
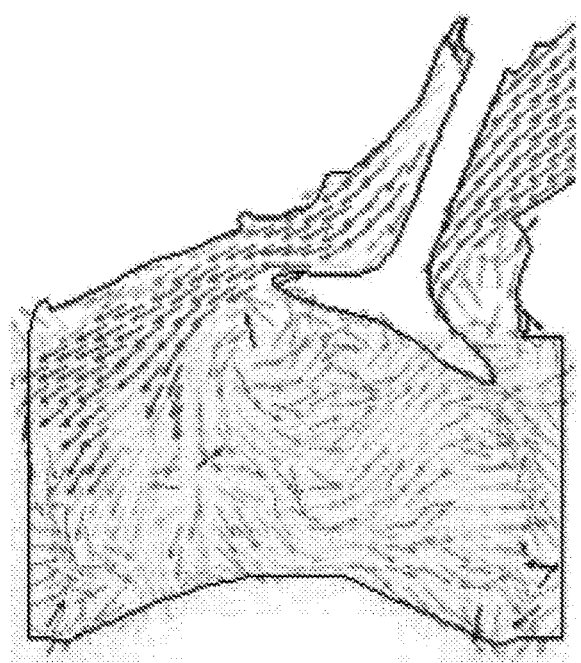
FIG. 12 is a view illustrating a result from analyzing the flow of the intake air flowed into the combustion chamber from the first intake port in a case where the machining depth is not adjusted based on the distance d when the variation of the distance d is at the lower limit.

Here, results from analyzing the flow of the intake air flowed into the combustion chamber 6 from the first intake port 12A in the cases where the machining depth is adjusted and not adjusted based on the distance d when variation of the distance d is at a lower limit (minimum value) are illustrated in FIGS. 11 and 12, respectively. In these drawings, arrows in darker color in gray scale indicate faster speeds of the intake flow.

When the adjustment is not performed (see FIG. 12), the intake air excessively flows to an upper section of the combustion chamber compared to when the adjustment is performed, and thus, the flow of the intake air contacts with a side wall of the combustion chamber 6 on the side of the first direction (side wall on the left side in FIG. 12), and the formation of the tumble flow becomes difficult. In this regard, when the adjustment is performed (see FIG. 11), the intake air flows to a suitable position in an upper end section of the combustion chamber 6 and further flows downward before contacting with the side wall of the combustion chamber 6 on the side of the first direction. Thus, the strong tumble flow is formed. Therefore, by performing the adjustment, the anti-combustion-chamber-side wall surface of the throat portion 25A of the first intake port 12A is machined to have a suitable shape according to the distance d, and thus, a stable and strong tumble flow can be obtained regardless of the variation of the installation positions of the intake port cores inside the casting mold.

In this embodiment, for each cylinder 2, the distance d regarding the first intake port 12A is measured, and based on the distance d, the machining depth of the first machining section 82 of the first intake port 12A in the first tool inserting direction is adjusted. Meanwhile, a machining depth of the second machining section 83 of the first intake port 12A in a second tool inserting direction, and a machining depth of an entire circumferential machining section 81 that is a portion of the second intake port 12B machined by the tool 91 (an entire circumference of the throat portion 25B) in a tool inserting direction are not adjusted.

Note that the machining depth of the second machining section 83 of the first intake port 12A of each cylinder 2 in the second tool inserting direction may be adjusted based on the distance d regarding the first intake port 12A.

Further, the machining depth of the entire circumferential machining section 81 of the second intake port 12B in the tool inserting direction may be adjusted. Here, this machining depth may be adjusted based on the distance d regarding the first intake port 12A. Alternatively, the distance d may be measured for the second intake port 12B and the machining depth of the entire circumferential machining section 81 may be adjusted based on the distance d. On the other hand, the machining depth of the first machining section 82 of the first intake port 12A in the first tool inserting direction may be adjusted based on the distance d regarding the second intake port 12B.

Next, a method of manufacturing the cylinder head 4 is described.

First, the cylinder head 4 is cast by the mold. In the casting, the intake ports 12 are formed by the respective intake port cores, and the exhaust ports 13 are formed by respective exhaust port cores. Further, the joining surface 100 of the cylinder head 4 to the cylinder block 3 (see FIG. 13) is formed by a molded surface of a metal mold. The joining surface 100 is formed with a plurality (four in FIG. 13) of material reference surfaces 101 by the molded surface of the metal mold. The plurality of material reference surfaces 101 are constituted by flat bottom surfaces of a plurality of concave portions concaved from the joining surface 100 by a predetermined length (a small value of about a few millimeters), respectively. The plurality of material reference surfaces 101 are located on a single plane perpendicular to extended lines of the center axes C the cylinders 2.

The head cover attaching surface 4e (the end surface on the opposite side from the combustion chamber 6) of the cylinder head 4 obtained by the casting are formed by cutting. Specifically, the head cover attaching surface 4e is formed by cutting with reference to the material reference surfaces 101 formed in the joining surface 100.

Next, each distance d in the center axis C direction of each cylinder 2, between the predetermined reference surface of the cylinder head 4 (the head cover attaching surface 4e) and the predetermined section in the longitudinally intermediate portion of the first intake port 12A of each cylinder 2 (the end surface of the guide member supporting portion 4a on the combustion chamber 6 side), is measured.

Then, as described above, the first machining section 82 of the throat portion 25A of each first intake port 12A is machined by the first tool 92 and the second machining section 83 of the throat portion 25A is machined by the second tool 93. When machining the first machining section 82, the machining depth of the first machining section 82 in the first tool inserting direction is adjusted based on the distance d. Further, the entire circumferential machining section 81 of the throat portion 25B of each second intake port 12B is machined by the tool 91.

The end surface of each guide member supporting portion 4a on the combustion chamber 6 side is cut into the plane perpendicular to the stem 14b of the corresponding intake valve 14, and the guide member hole 4b is formed in each guide member supporting portion 4a. Further, each guide member supporting portion 4c is also formed with the guide member hole 4d.

Next, the intake valve guide members 71 are inserted into the guide member holes 4b and the exhaust valve guide members 72 are inserted into the guide member holes 4d, respectively. Further, the intake valve seat 21 is fixedly attached to the opening portion of each intake port 12 to the combustion chamber 6, and the exhaust valve seat 22 is fixedly attached to the opening portion of each exhaust port 13 to the combustion chamber 6.

Next, the joining surface 100 of the cylinder head 4 to the cylinder block 3 is formed by cutting with reference to the material reference surfaces 101, and thus, the manufacturing of the cylinder head 4 is completed. Note that other parts which require machining are machined as needed.

Note that in this embodiment, to adjust the machining depth of the first machining section 82 in the first tool inserting direction, the distance d in the center axis C direction of the cylinder 2, between the head cover attaching surface 4e (the predetermined reference surface of the cylinder head 4) and the predetermined section in the longitudinally intermediate portion of the first intake port 12A to be machined by the first tool 92 (the end surface of the guide member supporting portion 4a on the combustion chamber 6 side), is measured; however, alternatively, by having the predetermined reference surface as each material reference surface 101 (see FIG. 13) formed in the joining surface 100 of the cylinder head 4 to the cylinder block 3, a distance h in the center axis C direction of the cylinder 2, between the material reference surface 101 as the predetermined reference surface and the predetermined section in the longitudinally intermediate portion of the first intake port 12A to be machined by the first tool 92 (the end surface of the guide member supporting portion 4a on the combustion chamber 6 side), may be measured, and the machining depth of the first machining section 82 in the first tool inserting direction may be adjusted based on the distance h. In this case, the relationship between the distance h and the machining depth of the first machining section 82 in the first tool inserting direction become as illustrated in FIG. 14. That is, when the distance h is long, the throat portion 25A of the first intake port 12A is located far from the combustion chamber 6 in the cylinder head 4, and therefore, the first tool 92 is inserted deeper to increase the machining depth. When a machining tolerance in the cut processing of the head cover attaching surface 4e has large variation, by adjusting the machining depth based on the distance h, the influence of the variation can be reduced.

Figure 13:
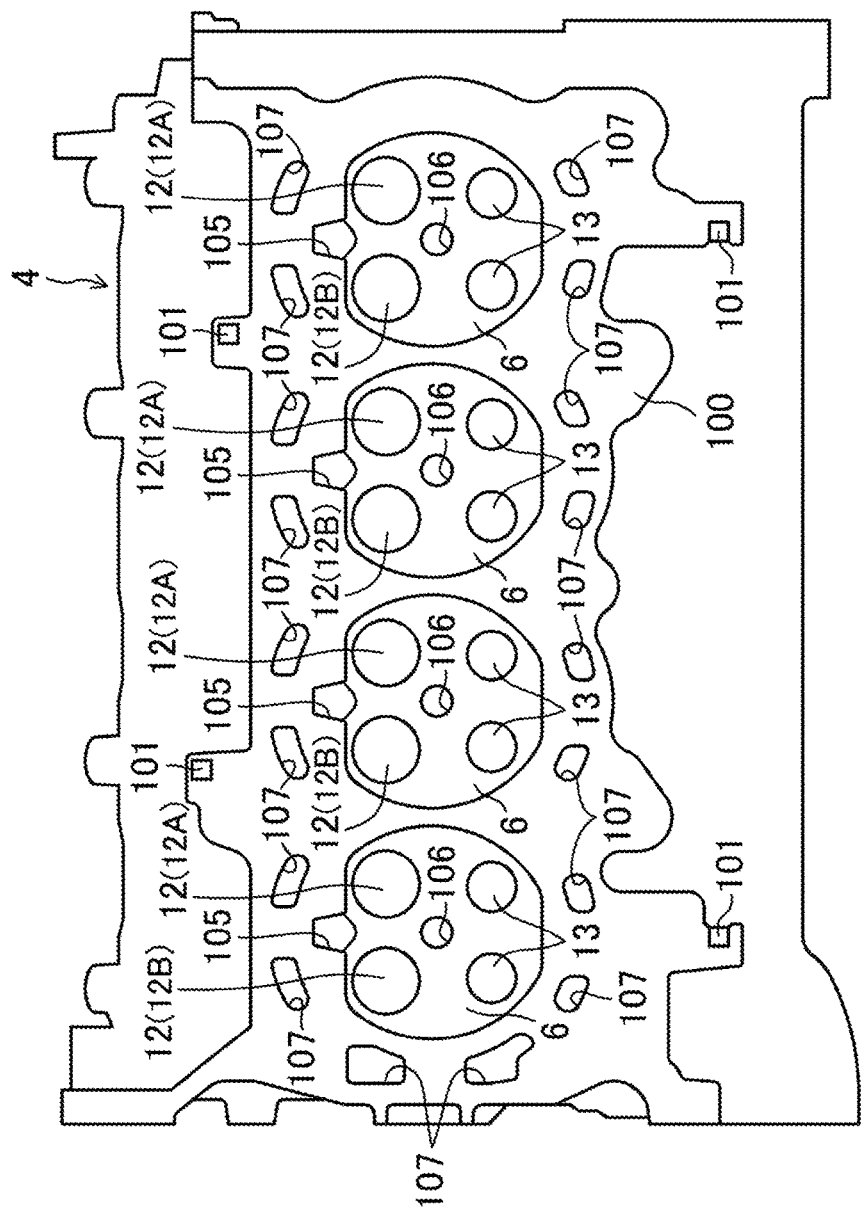
FIG. 13 is a view of the cylinder head seen from a side of a joining surface to be joined to a cylinder block.
Figure 14:
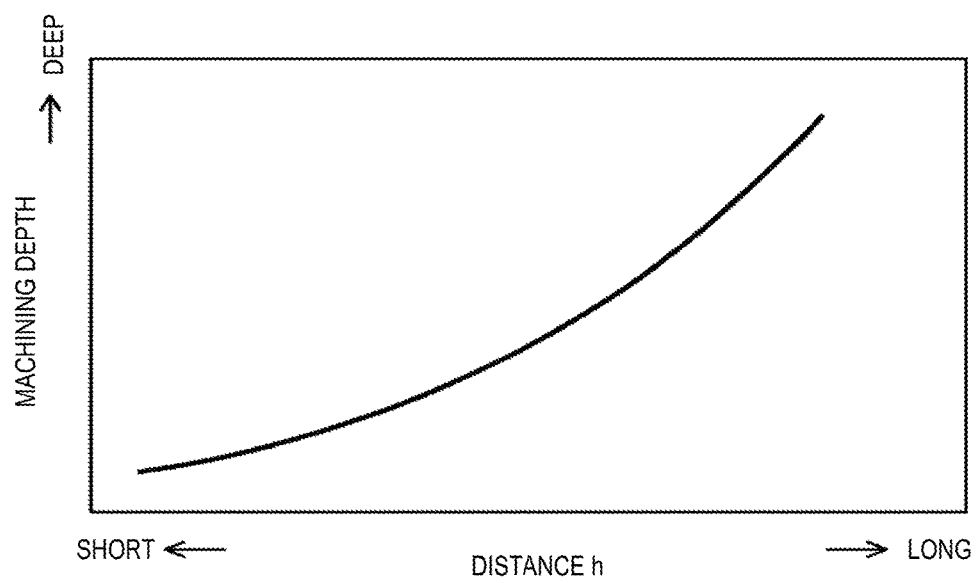
FIG. 14 is a chart illustrating a relationship between a distance h and the machining depth of the first machining section in the first tool inserting direction, the distance h taken in the center axis direction of the cylinder between a material reference surface as the predetermined reference surface of the cylinder head and the predetermined section in the first intake port which is machined by the first tool.

In FIG. 13, the reference character "105" indicates a hole through which the fuel injector 18 is installed, the reference character "106" indicates a hole through which the ignition plug 19 is installed, the reference character "107" indicates a hole for communicating the water jacket 3a of the cylinder block 3 with a water jacket of the cylinder head 4.

In this embodiment, in each cylinder 2, the first intake port 12A is designed to have a smaller passage cross-sectional area at the throat portion 25 than that in the second intake port 12B, and to cause the strength of the tumble flow of the intake air formed within the combustion chamber 6 when the flow of the intake air into the combustion chamber 6 is assumed to be caused only from the first intake port 12A, to be stronger than the strength of the tumble flow of the intake air formed within the combustion chamber 6 when the flow of the intake air into the combustion chamber 6 is assumed to be caused only from the second intake port 12B. Thus, when the intake air is flowed into the combustion chamber 6 from the two intake ports 12, the strong tumble flow of the intake air flowed into the combustion chamber 6 from the first intake port 12A becomes easily oriented toward the weak tumble flow of the intake air flowed into the combustion chamber 6 from the second intake port 12B. Therefore, the mixing performance of the intake air from the two intake ports 12 improves, and as a result, the mixing performance of the fuel with the intake air also improves.

Specifically, when the strengths of the tumble flows of the intake air from the two intake ports 12 are substantially the same, the intake air flowed into the combustion chamber 6 from the first intake port 12A and the intake air flowed into the combustion chamber 6 from the second intake port 12B flow separately on both sides of the first plane, and the intake air from the two intake ports 12 becomes difficult to mix with each other. Particularly in a case where the intake air from the two intake ports 12 is turbocharged and the both tumble flows of the intake air are significantly strong, the mixing performance of the intake air from the two intake ports 12 significantly degrades. As a result, the mixing performance of the fuel with the intake air within the combustion cavity 5a formed in the position in the top face of the piston 5 and on the center axis C of the cylinder 2 degrades. Thus, combustibility of the mixture gas of the fuel and the intake air when it is ignited by the ignition plug 19 disposed at a position in the cylinder head 4 and in the extended line of the center axis C of the cylinder 2 degrades.

In this regard, in this embodiment, by varying the strengths of the tumble flows of the intake air from the two intake ports 12 as described above, the strong tumble flow of the intake air becomes easily oriented toward the weak tumble flow of the intake air, the mixing performance of the fuel with the intake air within the combustion cavity 5a improves, and the combustibility of the mixture gas when it is ignited by the ignition plug 19 improves.

The strength of the tumble flow of the intake air from the first intake port 12A can easily be obtained by designing the throat portion 25A to have the small passage cross-sectional area and forming the throat portion 25A into the shape described above. Further, by designing the throat portion 25B of the second intake port 12B to have the large passage cross-sectional area, the flow amount of the intake air from the second intake port 12B can be increased, and an intake filling amount required within the turbocharging range of the engine 1 can easily be secured. Thus, in combination with the tumble ratio being the predetermined value (preferably, 2) or greater, within the turbocharging range of the engine 1, a fuel consumption can be improved while increasing an output of the engine 1.

Further, the anti-combustion-chamber-side and combustion-chamber-side wall surfaces of the throat portion 25A of the first intake port 12A can be formed into the shape with which the strong tumble flow of the intake air flowed into the combustion chamber 6 from the first intake port 12A can be obtained. Thus, the tumble ratio of the intake air flow within the combustion chamber 6 when the intake air flows into the combustion chamber 6 from the two intake ports 12 can be a high value (2 or greater).

The present invention is not limited to the embodiment described above, and may be substituted without deviating from the scope of the claims.

The embodiment described above is merely an illustration, and therefore, the present invention must not be interpreted in a limited way. The scope of the present invention is defined by the following claims, and all of modifications and changes falling under the equivalent range of the claims are within the scope of the present invention.

For example, the passage cross-sectional areas of the throat portion 25A of the first intake port 12A and the throat portion 12B of second intake port 25B, respectively, may not necessarily have circular shapes, and if the passage cross-sectional area of the throat portion 25A of the first intake port 12A is smaller than the passage cross-sectional area of the throat portion 25B of the second intake port 12B, then the respective passage cross-sectional areas may have shapes which are different than circular shapes.

The present invention is used for intake devices of engines having one or more cylinders, and is useful for intake devices of engines, including a cylinder head formed with two intake ports per cylinder and for flowing intake air into a combustion chamber of the cylinder, and a forced induction system for forcibly inducing the intake air.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

LIST OF REFERENCE CHARACTERS

1 Engine
4 Cylinder Head
5 Piston
5a Combustion Cavity
6 Combustion Chamber
12 Intake Port
12A First Intake Port (One of Intake Ports)
12B Second Intake Port (Other Intake Port)
18 Fuel Injector
19 Ignition Plug
25 Throat Portion
25A Throat Portion of First Intake Port
25B Throat Portion of Second Intake Port
50 Turbocharger
78 Edge of First Intake Port

What is claimed is:

1. An intake device of an engine having one or more cylinders, the intake device comprising:
   a cylinder head formed with two intake ports per cylinder for flowing intake air into a combustion chamber of the cylinder; and
   a forced induction system for forcibly inducing the intake air,
   wherein the two intake ports have respective throat portions, and in each cylinder, one of the two intake ports is designed to have a smaller passage cross-sectional area at its throat portion than a passage cross-sectional area of the throat portion of the other intake port, and to cause a strength of a tumble flow of intake air formed within the combustion chamber when a flow of the intake air into the combustion chamber is assumed to be only from the one of the two intake ports, to be stronger than a strength of a tumble flow of intake air formed within the combustion chamber when the flow of the intake air into the combustion chamber is assumed to be only from the other intake port, and
   wherein a tumble ratio of a flow of the intake air within the combustion chamber is a predetermined value or greater when the intake air is forcibly induced by the forced induction system and flows into the combustion chamber from the two intake ports within an operating range of the engine where the forced induction is performed.

2. The intake device of claim 1, wherein the predetermined value is 2.

3. The intake device of claim 1, wherein when seen in a center axis direction of each cylinder, the two intake ports of the cylinder extend to the combustion chamber in a first direction intersecting the center axis direction, and when seen in a second direction perpendicular to the center axis direction and the first direction, the two intake ports extend on an upper side of the combustion chamber while inclining to a combustion chamber side in the center axis direction, and open to the combustion chamber at opening portions of the intake ports, respectively, the opening portions located in a part of a surface of the cylinder head facing the combustion chamber, on an opposite side from the first direction, wherein in the cylinder head, an intake valve seat having a substantially ring shape and having a sealing surface on an inward side in a radial direction of the intake valve seat, is attached to the opening portion of the one of the intake ports, and when seen in the second direction, a part of a wall surface of the throat portion of the one of the intake ports has a shape for guiding intake air flowing near the part of the wall surface, to flow substantially straight toward an area that is on the radially inward side of the sealing surface and near a part of the sealing surface located on the side of the first direction, the part of the wall surface being a part on an opposite side from the combustion chamber in the center axis direction of the cylinder, and wherein when seen in the second direction, another part of the wall surface of the throat portion of the one of the intake ports is formed with an edge for orienting the intake air flowing near the other part of the wall surface, toward a center axis of an intake valve for opening and closing the one of the intake ports, the other part of the wall surface being a part on the combustion chamber side in the center axis direction of the cylinder.

4. The intake device of claim 2, wherein when seen in a center axis direction of each cylinder, the two intake ports of the cylinder extend to the combustion chamber in a first direction intersecting the center axis direction, and when seen in a second direction perpendicular to the center axis direction and the first direction, the two intake ports extend on an upper side of the combustion chamber while inclining to a combustion chamber side in the center axis direction, and open to the combustion chamber at opening portions of the intake ports, respectively, the opening portions located in a part of a surface of the cylinder head facing the combustion chamber, on an opposite side from the first direction, wherein in the cylinder head, an intake valve seat having a substantially ring shape and having a sealing surface on an inward side in a radial direction of the intake valve seat, is attached to the opening portion of the one of the intake ports, and when seen in the second direction, a part of a wall surface of the throat portion of the one of the intake ports has a shape for guiding intake air flowing near the part of the wall surface, to flow substantially straight toward an area that is on the radially inward side of the sealing surface and near a part of the sealing surface located on the side of the first direction, the part of the wall surface being a part on an opposite side from the combustion chamber in the center axis direction of the cylinder, and wherein when seen in the second direction, another part of the wall surface of the throat portion of the one of the intake ports is formed with an edge for orienting the intake air flowing near the other part of the wall surface, toward a center axis of an intake valve for opening and closing the one of the intake ports, the other part of the wall surface being a part on the combustion chamber side in the center axis direction of the cylinder.

5. The intake device of claim 1, wherein the one of the two intake ports of each cylinder is located on one side of the cylinder with respect to a predetermined plane including the center axis of the cylinder, and the other intake port is located on the other side of the cylinder, the engine includes, for each cylinder:
an ignition plug disposed in the cylinder head, in an extended line of the center axis of the cylinder;
a piston fitted into the cylinder and formed with a combustion cavity in a top face of the piston, on the center axis of the cylinder; and
a fuel injector for directly injecting fuel into the combustion chamber.

6. The intake device of claim 2, wherein one of the two intake ports of each cylinder is located on one side of the cylinder with respect to a predetermined plane including the center axis of the cylinder, and the other intake port is located on the other side of the cylinder, the engine includes, for each cylinder:
an ignition plug disposed in the cylinder head, in an extended line of the center axis of the cylinder;
a piston fitted into the cylinder and formed with a combustion cavity in a top face of the piston, on the center axis of the cylinder; and
a fuel injector for directly injecting fuel into the combustion chamber.

7. The intake device of claim 3, wherein one of the two intake ports of each cylinder is located on one side of the cylinder with respect to a predetermined plane including the center axis of the cylinder, and the other intake port is located on the other side of the cylinder, the engine includes, for each cylinder:
an ignition plug disposed in the cylinder head, in an extended line of the center axis of the cylinder;
a piston fitted into the cylinder and formed with a combustion cavity in a top face of the piston, on the center axis of the cylinder; and
a fuel injector for directly injecting fuel into the combustion chamber.

8. The intake device of claim 4, wherein one of the two intake ports of each cylinder is located on one side of the cylinder with respect to a predetermined plane including the center axis of the cylinder, and the other intake port is located on the other side of the cylinder, the engine includes, for each cylinder:
an ignition plug disposed in the cylinder head, in an extended line of the center axis of the cylinder;
a piston fitted into the cylinder and formed with a combustion cavity in a top face of the piston, on the center axis of the cylinder; and
a fuel injector for directly injecting fuel into the combustion chamber.

* * * * *